(12) United States Patent
Schwab

(10) Patent No.: US 9,109,743 B2
(45) Date of Patent: Aug. 18, 2015

(54) HEXAPOD

(76) Inventor: Martin Schwab, Obererlbach (DE)

(*) Notice: Subject to any disclaimer, the term of this patent is extended or adjusted under 35 U.S.C. 154(b) by 88 days.

(21) Appl. No.: 13/807,575

(22) PCT Filed: Jun. 21, 2011

(86) PCT No.: PCT/EP2011/060338
§ 371 (c)(1),
(2), (4) Date: Dec. 28, 2012

(87) PCT Pub. No.: WO2012/000840
PCT Pub. Date: Jan. 5, 2012

(65) Prior Publication Data
US 2013/0099085 A1    Apr. 25, 2013

(30) Foreign Application Priority Data
Jun. 28, 2010  (DE) .......................... 10 2010 025 275

(51) Int. Cl.
| B25J 17/02 | (2006.01) |
| F16M 13/02 | (2006.01) |
| B23Q 1/54 | (2006.01) |
| F16H 21/46 | (2006.01) |

(52) U.S. Cl.
CPC ........... *F16M 13/022* (2013.01); *B23Q 1/5462* (2013.01); *B25J 17/0266* (2013.01); *F16H 21/46* (2013.01)

(58) Field of Classification Search
USPC .......... 248/276.1, 282.1, 283.1, 285.1, 286.1, 248/287.1, 660, 652, 653, 662, 664; 74/490.01, 490.8, 480.09
See application file for complete search history.

(56) References Cited

U.S. PATENT DOCUMENTS

| 4,806,068 | A | 2/1989 | Kohli et al. |
| 4,919,382 | A * | 4/1990 | Forman ...................... 248/178.1 |
| 4,988,244 | A | 1/1991 | Sheldon et al. |
| 5,388,935 | A | 2/1995 | Sheldon |
| 6,196,081 | B1 * | 3/2001 | Yau ............................. 74/479.01 |
| 6,330,837 | B1 | 12/2001 | Charles |
| 8,430,878 | B2 * | 4/2013 | Vasta et al. ...................... 606/56 |
| 2012/0286123 | A1 * | 11/2012 | Schwab ................... 248/346.06 |
| 2013/0245625 | A1 * | 9/2013 | Vasta et al. ...................... 606/56 |

FOREIGN PATENT DOCUMENTS

| JP | 6509284 A | 10/1994 |
| JP | 2000506450 A | 5/2000 |
| JP | 2000291761 A | 10/2000 |
| JP | 2003532544 A | 11/2003 |
| JP | 2004520952 A | 7/2004 |
| JP | 2004291166 A | 10/2004 |
| SU | 1049244 A1 | 10/1983 |
| WO | 9217313 A2 | 10/1992 |
| WO | 2004/033161 A1 | 4/2004 |
| WO | 2006133583 A1 | 12/2006 |

* cited by examiner

*Primary Examiner* — Alfred J Wujciak
(74) *Attorney, Agent, or Firm* — Lucas & Mercanti, LLP

(57) ABSTRACT

The hexapod comprising a preferably plate-shaped receptacle on which at least five, preferably six rods mounted in joints are arranged wherein the other end of each rod is articulated on a mounting, wherein all the mountings can be moved along a circular railway of movement characterized by each mounting being arranged on a separate support ring wherein the respective support ring including the mounting arranged on it are movable, and by each support ring constitute the rotor or part of a rotor of an electromotive drive means comprising also a ring-shaped stator assigned to the individual support ring.

6 Claims, 13 Drawing Sheets

HEXAPOD

CROSS-REFERENCE TO RELATED APPLICATIONS

This application is a 371 of PCT/EP2011/060338 filed Jun. 21, 2011, which in turn claims the priority of DE 10 2010 025 275.1 filed Jun. 28, 2010, the priority of both applications is hereby claimed and both applications are Incorporated by reference herein.

The invention concerns a hexapod comprising a preferably plate-shaped receptacle on which at least five, preferably six rods mounted in separate joints are arranged, wherein the other end of each rod is articulated on a mounting, wherein all the mountings can be moved along a circular path.

A hexapod is a means of positioning or control allowing to change the spatial position of any object situated on the preferably plate-shaped receptacle. To this effect, the receptacle, which may also be a ring or the like, is articulated to at least five, preferably six rods of constant length mounted in separate joints, wherein the other end of each rod is articulated on a mounting. Each mounting is arranged movably on a common circular rail so as to run along the circular path defined by the circular rail. Any movement of the mountings will necessarily change the spacing of the rod ends articulated to them, while the spacing of the rods will also necessarily change the angles of the respective rods to each other and consequently the spatial position of the rod joints located on the receptacle. This allows to control all six degrees of freedom of the movable receptacle. However, the possible positions assumed are limited because of the guidance of the mountings on a common circular rail and specific positioning tasks cannot be accomplished with such a hexapod.

Another problem with a hexapod of the aforementioned type is the fact that the mountings movably guided on the common circular rail path are connected with their own driving means, that is to say with their own drive motor which is moved along with the mounting. This means that not only the mountings but also their drive motors are moved along the circular rail which, for instance, mesh by a gear mechanism with a corresponding circular rail gearing. Since every drive motor is connected with a cable the following will happen: When the receptacle is rotated by 360°, which is basically possible, so when all mounting run through 360° on the circular railway, the cables will coil up, as a consequence of which 360° turns are possible only to a limited extent.

Hence, the underlying problem of the invention is to indicate an improved hexapod.

To solve this problem, a first invention alternative provides for a hexapod of the type mentioned above that each mounting is arranged on a separate support ring, with the respective support ring being movable together with the mounting arranged on it and that each support ring constitutes the rotor or part of a rotor of an electromotive drive means also comprising a ring-shaped stator assigned to the respective support ring.

In the hexapod according to the invention—this applies to any and all alternatives to the invention—the "rigid" tying of the mounting to one circular-path support only, as known from the state of the art, is eliminated. According to the invention, each mounting is arranged on a separate support ring, which means at least five, preferably six, separate pairs of mountings and support rings are provided. Each support ring is moved together with the mounting, which means that the mounting is firmly arranged on it. The support ring turns around its center. An electromotive drive means comprising a magnetic field driven rotor as well as a stator is provided to allow for such rotation. According to the invention, the support ring itself constitutes the rotor or part of the rotor; hence it is rotated relatively to the firmly positioned, also ring-shaped stator assigned to it. The rotor-stator arrangement does therefore not have any mechanic drive connection between the drive means parts which are rotor and stator, which is different from the state of the art where usually a driving electric motor is provided for engaging through a gear wheel at a respective gearing as described above. The drive rather is effected by a magnetic field built up between stator and rotor and wandering along the stator, locally interacting with the rotor, which is the support ring, and driving it.

The "decoupling" of the mountings according to the invention by assigning or arranging them each on a separate support ring specific for the mounting as well as the design of the driving means as a rotor-stator drive allowing for designing the support ring as a merely rotating member without any supply ducts fed or the like allows with a special advantage any number of 360° rotations of the individual support rings without involving the risk of cable coiled up and, consequently, the accomplishment of even complex positioning tasks requiring multiple 360° rotations.

Various embodiments are conceivable for the spatial arrangement of the support rings and the respective assigned stators. A preferred embodiment is that the support rings are arranged concentrically one above another, i.e. they are positioned in parallel horizontal planes one above another thus being turned around a common central axis of rotation. Correspondingly, the stators assigned to the respective support rings are also arranged concentrically one above another. In this arrangement, all support rings have the same diameter, and the same is true for the assigned stators. It is also conceivable to arrange all support rings concentrically lying one inside another, i.e. that the ring diameters decrease from one ring to the next. Basically, it is possible to also arrange the associated stators in a similar way in the same horizontal plane, and therefore, arrange them together with the associated support rings one inside the other. At the same time, it is conceivable to provide the support rings with corresponding projections that are extended in the direction of the axis of rotation, on which corresponding ring segments are provided or are forming such ring segments which interact with the stators positioned below the plane of the support rings. This makes it possible to arrange the support rings in rather a compact position lying one inside another, and thus, not having to arrange the stators as well as they are displaced into the area below the support ring plane. The individual ring-specific projections in axial direction may be of different lengths so that the individual stators can be arranged on different planes. However, the rings are basically here also movable around a common axis of rotation. Also conceivable is a combination of both arrangement alternatives in which the rings or ring segments are arranged vertically and radially staggered from each other thus yielding an arrangement that is tiered from top to bottom. Hence, in this embodiment of the invention the ring diameters and the diameters of the individually assigned stators gradually decrease, and the respective rotor-stator couples are positioned on vertically staggered planes.

As an alternative to such virtually compact arrangements, it is also conceivable to arrange the individual support rings along with their stators in different planes tilted to one another. Last but not least any spatial positioning of the rotor-stator couples is possible as long as it allows for a support ring rotation with the adjustment of the receptacle resulting therefrom.

Two different configurations are basically conceivable for the spatial arrangement of the rotor to the stator. According to the first one, it is designed as an internal rotor in which the respective rotor is arranged inside the stator assigned to it, or the form of construction as an external rotor in which the stator is arranged within the rotor assigned to it. In the hexapod according to the invention, both versions can be realized even irrespective of the specific spatial positioning of the individual rotor-stator drives to each other (concentrically one above another, staggered etc.).

Since the rotor is a rotatable member, it is to be arranged appropriately to allow for a rotation with as little friction as possible. To this effect, the support rings can be arranged by means of bearings on one or several stationary members. Such a stationary bearing member may also be the respective stator itself which may have a bearing section with an annular flange radially extending inwardly or outwardly on which the rotor is pivoted by means of an appropriate bearing means. However, in a concentric arrangement of the support rings vertically one above another, it is also conceivable to mount the rings via bearing means arranged between them. Therefore, appropriate bearing means such as ball bearings and the like are positioned between the individual rotors so that the rotors directly roll on one another. The bearing means used, for instance the ball bearing described, can be a "complete" ball bearing consisting of two axial bearing rings with balls between them with the respective bearing rings connected to one and to the other rotor. However, it is also conceivable to use the individual rotor itself as part of the bearing, hence to design it with a ball groove so that only the balls are left to be set between the rotors constituting the bearing rings. Like the stator with its bearing section described above, at which also a ball groove may be designed, the rotor can also be part of the bearing means itself. At this point, we should state that, aside from the ball bearing described, it goes without saying that any other type of bearing such as roller bearings, needle bearings, sliding bearings and the like, up to air bearings may be used as well.

As an alternative to the described, virtually "internal" bearing of the rotors it is also conceivable to design the respective support rings with a bearing arm, and to mount all bearing arms through bearing means at a common central bearing support. This form of construction is possible only if the driving means are designed as internal rotors. To this effect, a central bearing support is provided which extends, for instance, from one bottom plate of the hexapod in concentric annular arrangement through the individual rings. Corresponding bearing sections are provided on it, at which the individual bearing arms are pivoted by means of appropriate bearing means (roller bearings, sliding bearings etc.).

The types of bearings described are not final, of course. It goes without saying that the most diverse bearing versions are conceivable which may among others also depend on whether the individual driving means is designed as an internal or as an external rotor. It might also be conceivable to provide a corresponding housing for an external rotor on which the externally positioned rotors are pivoted. For an internal rotor type, an internal housing would be conceivable as a place for the bearing, or the like.

In addition to the embodiment of the invention as described above with support rings and stator rings wherein a distinct stator ring is assigned to each closed support ring, a second basic invention alternative with a hexapod of the aforementioned kind provides that each mounting is arranged on a separate support ring segment, wherein the respective support ring segment including the mounting arranged on it is movable, and that each support ring segment forms the rotor or part of a rotor of an electromotive driving means further comprising at least one ring-shaped stator assigned to the support ring segments.

According to this alternative, a mounting is not arranged on a closed support ring but on a ring segment circulating around a certain angle segment which may even be small in dimension, i.e. only a few degrees. The ring segment forms the rotor of the electromotive drive together with the stator, between the two of them a magnetic field has an effect here as well generated by the stator and running along the stator for a rotary movement, with a coupling drive effect on the two of them. Therefore, the rotor is reduced to a segment part, the formation of a closed ring is not required. Here, however, an individual ring-shaped stator may basically be assigned to each support ring segment as well, i.e. each segment has its own rail. According to a particularly expedient design, however, a common stator ring is assigned to several support ring segments, i.e. two support ring segments are guided on one common stator, for example.

They can be moved separately by suitably actuating the elements on the stator side generating the magnetic field, i.e. on the stator side separate local magnetic fields are generated. Several rotors (frequently also called runners) are logically actuated by suitable actuation for the generation of the magnetic field on a common stator ring, e.g. two support ring segments may be guided on a common stator ring so that three stator rings are provided for six segments. It is also possible to guide three segments on one stator ring so that only two stator rings are required. According to a particularly expedient and miniature version, all the five or six support ring segments are guided on a common stator. Here, only a single stator ring is provided on which up to six common tracks are located which are separated from one another in their control mechanism, i.e. concerning the generation of the driving magnetic fields. Thus, they also constitute six ring tracks virtually separated from one another with support ring segments that can be positioned independently from one another.

Even this alternative of the invention offers the advantages already described in the first alternative of the invention with regard to the state of the art. In particular, it allows for unlimited 360° rotations due to the mechanical decoupling of rotor and stator, as the realization of the electromotive drive ensures that no lines etc hamper the rotation.

This alternative of the invention has undergone further development in a particular advantageous way in that each support ring segment—from a vertical aspect—levitates above the stator over a magnetic field acting between rotor and stator. As described, the driving principle is the principle of an electric motor, which means a drive concept based on a magnetic field. If the respective rotor is positioned above the stator, the respective rotor may levitate in a defined distance above the stator by appropriately controlling the magnetic field acting between rotor and stator which—as described below—is generated through field generation means, i.e. coils on the stator. If, for instance, only one common stator ring is used, all five or six support rings segments with their mountings will levitate on it. They are kept at a defined distance to the stator through the controlled magnetic fields. The stator—irrespective of whether only one stator or several stators are provided—has a plurality of individually actuable electric coils which can be separately energized. The rotor, which will be explained below in detail, has permanent magnets or is kept at a distance merely by the controlled energizing of the coils (reluctance with soft iron core).

If the stator field now runs along the stator track, it drags the rotor, hence the support ring segment including the mounting, the latter therefore runs with the excitation field. Hence, this is the functional principle of a linear motor (rotary field linear motor), which forms a closed circular railway, here, according to the invention. The support ring segments are all kept and guided via the interactive magnetic field on the stator. No bearing elements are required here.

The electromotive drive principle underlying the drive means may be any drive principle as long as it uses a rotor-stator arrangement. This applies in particular to any and all described versions of and alternatives to the invention. Rotor and stator together form an electric motor wherein basically almost any kind of electromotive drive may be realized which can be integrated into the hexapod-specific rotor-stator arrangement or designed with them. One possibility may be to design the electromotive drive as a multiphase, as an electronic commuted AC or DC servo motor, as a bell-type anchor motor, as a brush-type DC motor, as a pancake motor, as a split-phase motor or as a linear motor. It goes without saying that any components to be energized e.g. which require a cable connection are provided on the stator. On the rotor, there are only the necessary components which do not require any supply so that no cables are to be ducted there. The stator consists of or comprises a plurality of separately energizable coils for generating a magnetic field interacting with the rotor, i.e. the stator is separately excited, which is an advantage for the exact control of the ring positioning. On the support ring or the support ring segment itself, a plurality of magnetic elements arranged for instance in circular configuration and interacting with the magnetic field generated by the stator, are provided. When using closed support rings, however, it is not necessary to distribute the magnetic elements over the entire circumference of the support ring. For a driving interaction with a magnetic field generated only locally by the stator, the magnetic elements are also provided locally only. It is conceivable that registration means are provided to be able to register where the magnetic elements provided on the rotor side are in position so that the control mechanism can actuate only those coils, which currently have to generate a magnetic field for interacting with the magnetic elements on the rotor. Alternatively, it is also possible to form the support ring or the support ring segment itself out of these magnetic elements. The magnetic elements to be used may be sheet metal or permanent solenoids and the like. It can basically be stated that any design and dimensioning of the coils as well as any design and dimensioning of the magnetic elements can be used and that the individual selection is based on the necessities of the realized electromotive drive i.e. of the realized motor type (see above not final enumeration).

The resolution on the circumference, i.e. the number of coils provided on the stator as well as the magnetic elements provided on the rotor may be designed at will and according to the individual requirement or purpose planned for using the hexapod. For instance, if a stator is erected as a 64-pole multiphase motor stator, having 64 coils which can be separately energized, an adequate control mechanism with 128 phases may break down the circumference into 16,384 phases in total, i.e. 16,384 defined ring positions can be actuated. This example already shows the high precision of any positioning option of the individual support rings or support rings segments and the high-precision adjustability of a desired spatial position of the receptacle.

As described, the energizable coils are provided on the stator. To this effect, the stator may consist of a basic ring, on which radially inwardly or radially outwardly (depending on the embodiment as an internal rotor or an external rotor, which will be explained below), coil supports, which constitute the coil cores, protrude and around which the coils are wrapped. The arrangement and the dimensioning of the coil supports including the coils themselves and their coiling shall, of course, be chosen according to the motor. In a linear motor version, the coils are coiled around the stator in radial direction, any protruding coil supports are not required in this case. Next to the coils, depending on the version, the support ring segment or the support ring or the part of the ring on which the magnetic elements interacting with the coils or the magnetic field generated thereby, are provided. The support ring or the support ring segment may completely be made of these magnetic elements. Where suitable magnetic sheet metal is used, the ring or the segment is ultimately an assembled sheet metal component. However, it goes without saying that it is also conceivable to arrange separate magnetic elements on the support ring or the ring segment, hence to arrange corresponding sheet metal or permanent magnets. A user-defined design is possible here as well and results from the drive selected or the desired hexapod model or even from a consideration of the field of application.

In order to capture the exact position of the support ring or the support ring segment in relation to the stator, at least one position sensor to capture the position of the rotor in relation to the stator is allocated to each support ring or support ring segment in a development of the invention. This position sensor which should have a resolution as high as possible, the ring or segment position allows a very exact determination of the ring position or segment position, which is required to exactly control the individual support rings or ring segments with regards to the receptacle position to be actuated. It goes without saying that also here the configuration does not provide for any cables or the like fed into the rotor in order to operate the position sensor, the position sensor is rather located on the stator, interacting with the rotor.

Preferably, Hall sensors arranged on the stator are used as position sensors, Interacting with the signal-giving elements on the respective support ring or support ring segment. A Hall sensor uses the Hall effect to measure magnetic fields. When current flows through a Hall sensor and then taken into a magnetic field extending perpendicular to it, it supplies an output voltage depending on the magnetic field strength which thus constitutes a parameter for magnetic field impact. In case corresponding signal giving elements are arranged on the support ring or on the support ring segment, which allow a field interaction with the Hall sensors, the position can easily be captured as a result. It is particularly expedient if the signal giving elements are the magnetic elements themselves provided on the support ring or segment, i.e. that the position sensors directly interact with the magnetic elements of the support ring or the support ring segment thus capture the position, so that no additional signal giving elements need to be arranged.

Finally, one development of the invention provides for using a common control mechanism controlling the individual drive means, via which the individual drive means are separately controlled, i.e. that every single coil or the energizing of every single coil is separately actuated by means of the control mechanism, as required by the desired ring movement or segment movement to carry out the positioning task in order to build up the magnetic field required for this.

Finally it should be stated that notwithstanding the fact that an electromotive drive principle was described above, other drive principles using a rotor and a stator may be used as well. Also the realization of a compressed air-driven, a thermodynamic or a hydrostatic drive principle with the rotor and the stator to be designed as required for the drive principle to be realized.

Basically, the realized drive principle, in particular the electromotive drive principle, is highly dynamic as huge torques can be generated at concomitant high rotation speeds. Separate transmission systems and the like are not required. This means that the hexapod according to the invention is particularly suited for dynamic applications in any field of application. The hexapod according to the invention may be used wherever a spatial movement of an object or an exact spatial positioning of an object arranged on the receptacle or connected to it, is required. The devices which can be moved and positioned by means of the receptacle can be of any nature. Small and miniature devices such as surgical means or work materials used in medical technology, arranged on the receptacle and movable by displacing the receptacle within space also in any relation to an object to be attended to, are conceivable. It is also conceivable to use it for tools or work piece holders used in processing technology, where the tool or the work piece to be processed is located in the holding fixture on the receptacle. The tool, such as a cutter or the like, is turned by the hexapod and moved in relation to the work piece, or the work piece located on the holder is moved by the hexapod in relation to a tool, for instance, fixed in position or a tool which can also be moved by a hexapod or any other manipulator. Even large structures such as telescopes or satellite dishes or simulators such as flight simulators, helicopter simulators or vehicle simulators can be equipped with a hexapod according to the invention. A hexapod may position a telescope or individual lenses or other components with maximum precision to any position within space. A hexapod may also align a satellite dish of any size to a fixed point with maximum precision. When applied in simulators, highly dynamic positioning movements up to crash simulations are conceivable, using the hexapod according to the invention. Also conceivable is the application with an X-ray device, particularly with a computer tomography device. At the ring-shaped receptacle, the dimension of which is selected so as to allow for moving an object through it, a radiation source and a radiation recipient can be arranged one opposite the other. The object is now moved through the receptacle, as the hexapod itself is also a ring-shaped open component, the object can necessarily be moved through it. Hence, this allows to move the imaging unit (radiation source and radiation recipient) along the object and, of course, also to turn it at high speed by turning the support rings around the patient. The adjustability of the spatial position of the receptacle therefore also allows any tilting of the imaging plane in relation to the patient so that the imaging plane can be selected at will and set even during the examination and pictures can be taken from different directions and angles of rotation. However, the use is not only conceivable for the field of X-ray imaging but basically for any imaging examination method such as for possible radiation therapies and the like.

Further advantages, features and details result from the embodiments hereinafter described as well as from the drawing. In the drawing.

Figure 1:
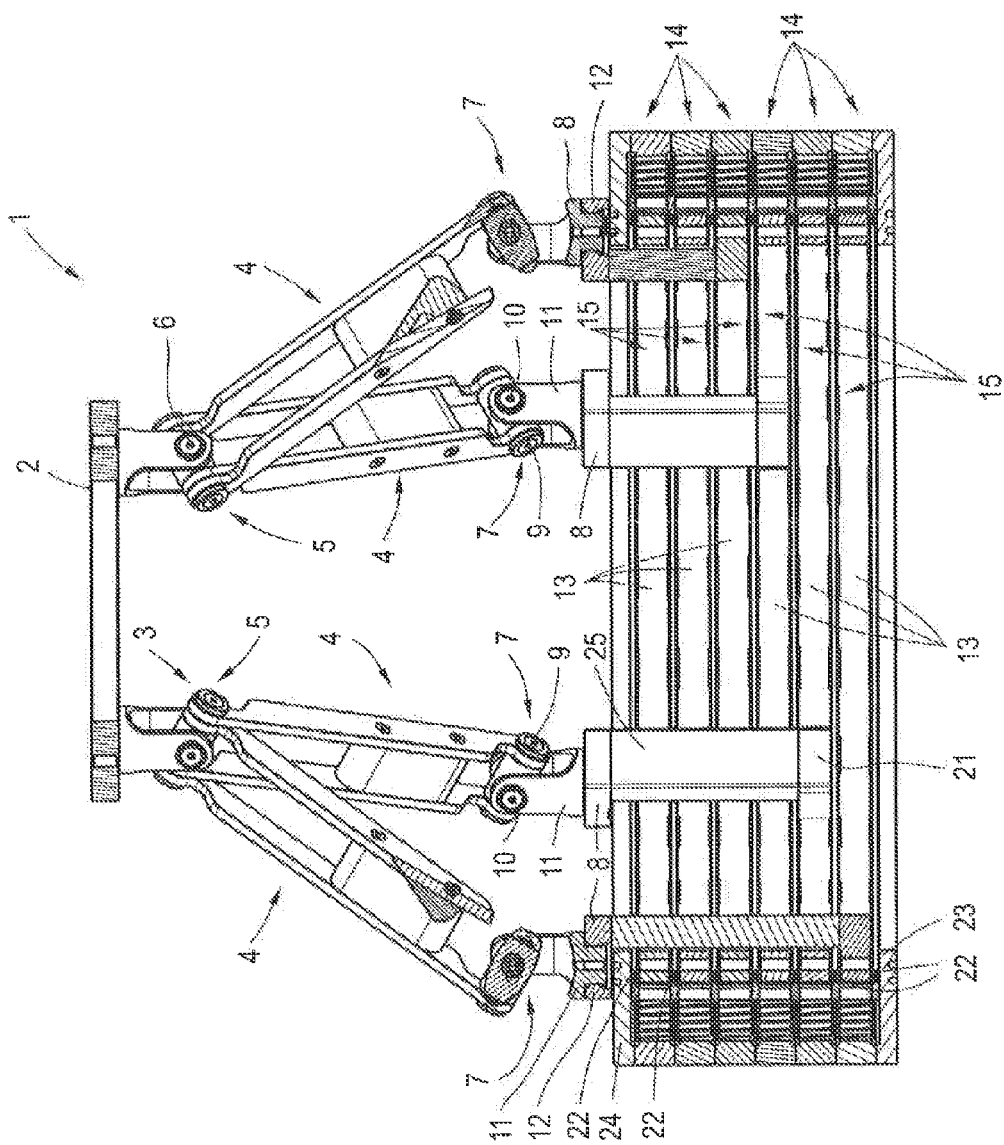
FIG. 1 shows the cross-section of a schematic diagram of a hexapod according to the invention in a first embodiment.
Figure 16:
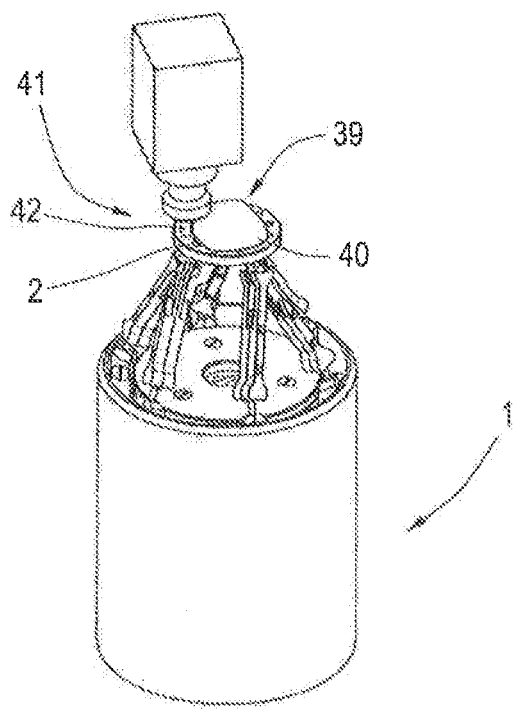
Figure 17:
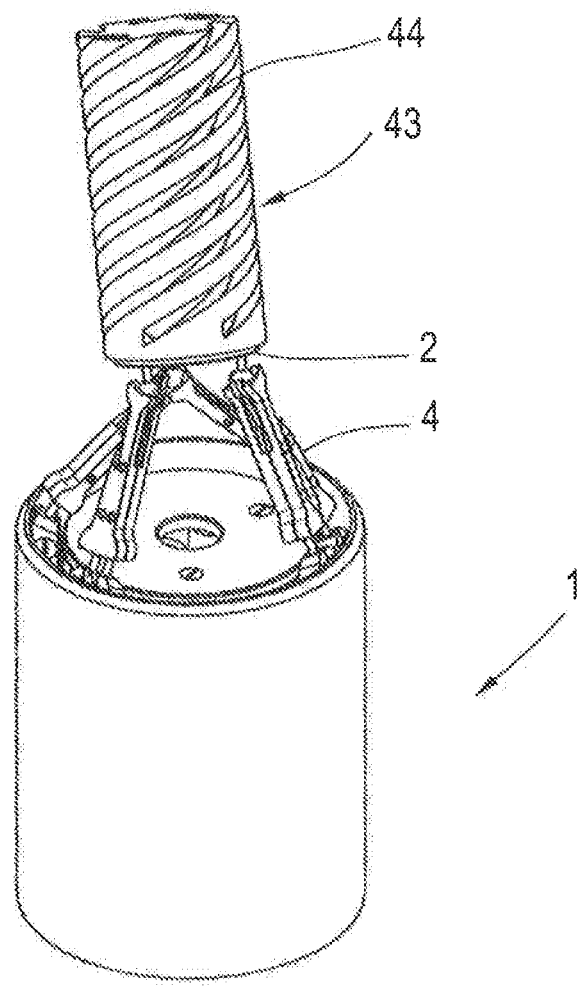

FIG. 16 shows a schematic diagram of a fifth application of the hexapod according to the invention; and FIG. 17 shows a schematic diagram of a sixth application of the hexapod according to the invention FIG. 1 shows a hexapod 1 according to the invention, comprising for instance a plate- or ring-shaped receptacle 2, on which an object (not shown in detail herein), which can be moved by means of hexapod 1 within space, is arranged. Movably mounted rods 4 are arranged in articulated joints 3 on the receptacle 2 wherein six rods are provided in total, but only four rods are shown in the cross section according to FIG. 1. The rods are pivotably mounted in a first rotating joint 5 about an axis wherein the rotating joint 5 itself is pivotably mounted on a corresponding projection of receptacle 2. Therefore, this results in a cardan-type spherical bearing of the individual rods 4.

Each of the other ends of the rods 4 is arranged via another joint 7 on a mounting 8. Joint 7 in turn comprises a rotating joint 9 which itself is rotatable-mounted about a further axis of rotation 10 on a joint mounting 11, which itself is pivotably held on the mounting 8. Here, too, a cardan movement bearing has been realized with an additional torsion option around the pivot bearing 12 of the joint mounting 11. In all, the bearing described herein reveals a high-grade movability of receptacle 2, which can therefore be positioned in extremely numerous spatial positions, by modifying the relative position of the individual mountings 8 to one another, which will be explained in detail in the following.

Furthermore, Hexapod 1 comprises a total of six support rings 13. A mounting 8 is fixed on each support ring 13 for which the mounting 8 has a segment 25 virtually running in axial direction, and merges with a fixation section 21 via which mounting 8 is fasted on the respective support ring 13. As can be seen, the support rings 13 are arranged concentrically one above another, all support rings have the same diameter, and they can all rotate about a common central axis.

The individual support rings 13 constitute the rotor of a drive means, which also comprises a stator 14 in addition to the support ring 13, i.e. the rotor, wherein one stator 14 is assigned to each support ring. The stators rotate outside the rotors 15, i.e. each rotor 15 is an internal rotor, consequently, each drive means formed from one rotor 15 and one stator is an internal rotor drive.

Figure 2:
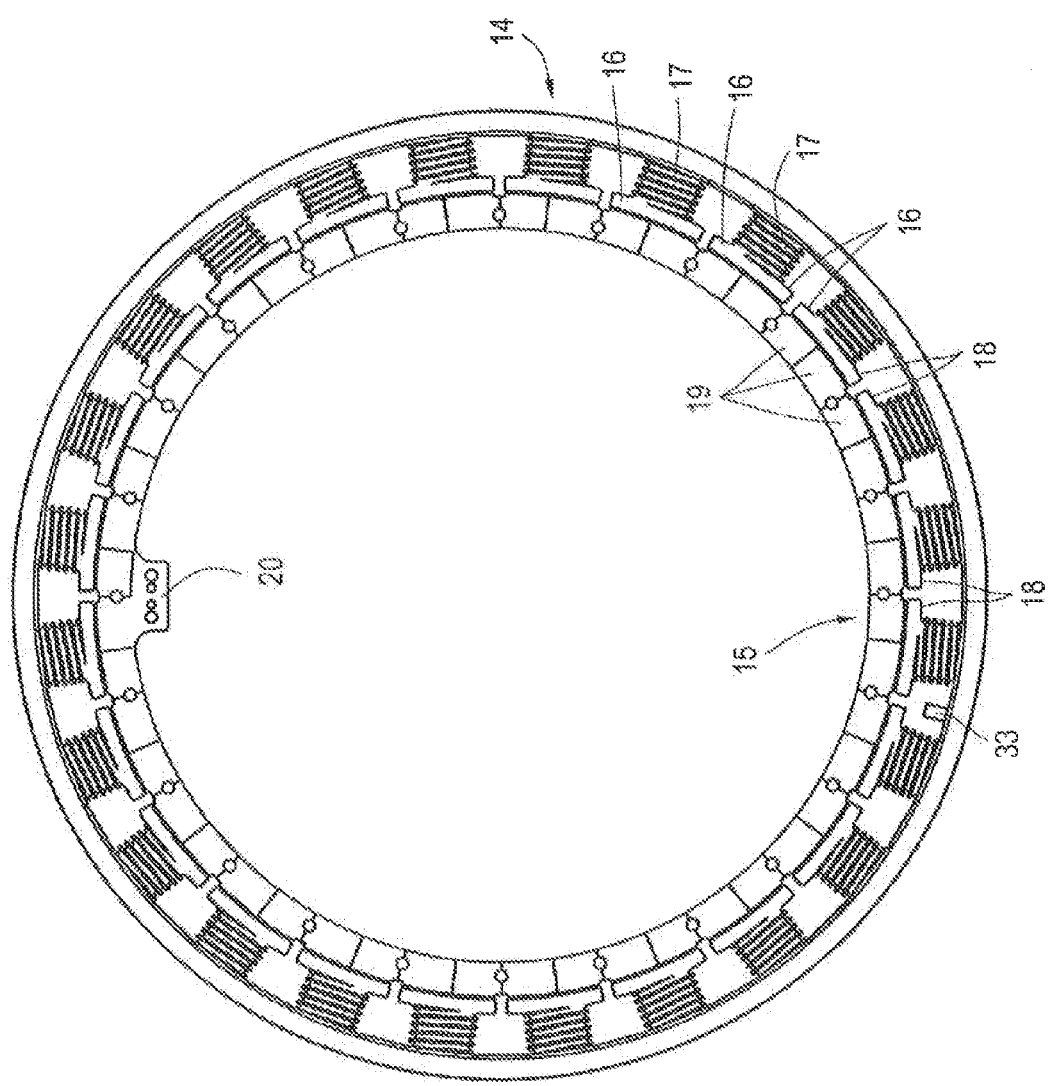
FIG. 2 shows a top view on a support ring-stator arrangement of the hexapod from FIG. 1.

The drive means is an electromotive drive, on stator 14, see also FIG. 2, coil supports 16 projecting radially inwardly are provided, carrying one coil 17 each, i.e. coil 17 is wound around the coil support 16. The coil supports 16 have on their inner face broadened sections 18, opposite of which rotor 15 is located. In the embodiment described here, the individual support ring 13 constitutes at the same time rotor 15. To this effect, the support ring consists of a plurality of individual magnetic elements 19, such as appropriate sheet metal packets or the like, which, see FIG. 2, are mounted in a ring shape. On this rotor 15, mounting 8 is fastened on a fixation section 20 through its fixation section 21.

As can been seen in FIG. 1, the rotors 15 and stators 14 are located one above another, from a vertical view. While stators 14 are fixed in position, rotors 15 rotate in operation, which will be explained later in this text. Bearing means 22, with an axial effect in the embodiment shown, are provided to enable such rotary movement. From a vertical view, bearing means 22 are located between the individual rotors 15, i.e. the lowest rotor 15 and the bottom plate 23, or the top rotor 15 and the top plate 24, respectively. Such bearing means 12 may be simple balls guided in appropriate ball grooves not shown herein in detail, formed on the individual top and bottom sides of the rotors 15 and the bottom plate 23 and the top plate 24, respectively. These ball groves constitute the rolling surfaces for the balls so that no separate ball races are provided. It goes without saying that complete axial bearings can also be used. In any case, each support ring 13 and, consequently, each rotor 15 is separately twistable.

The movement of the individual support rings 15, and resulting from that the movement of the individual mountings and again resulting from that the movement and the spatial adjustment of the single rods 4 result from the configuration of corresponding magnetic fields via the stator 14 and the interaction of the magnetic fields with rotor 15, respectively with the magnetic elements 19 there. Via a control device, not explicitly shown, it is possible to control separately each single coil 17 of each stator 14, i. e. supply them with electricity. A magnetic field is set up by means of supplying a coil with electricity, which magnetic field interacts with the magnetic elements 19 of the stator 14. This magnetic field can move circumferentially by means of an appropriate coil control so that rotor 15 is moved via this travelling field. Based on the control of the coils 17 a single support ring 13 can be turned or several support rings 13 or all support rings simultaneously. This facilitates the adjustment of the support rings 13 as desired with respect to each other within the scope of the circumferential freedom of movement of the single mountings 8. A change of the angle position of the single rods 4 relative to each other results from this, which in turn is expressed in a corresponding change of the spatial position of receptacle 2.

Furthermore, it is provided that a position sensor 33 is arranged at the stator 14, for example a Hall sensor which serves for the capture of the exact position of rotor 15 (see FIG. 2). This sensor interacts with the magnetic elements 19 and is therefore able to capture the movement of the individual magnetic elements 19 rotating past it. It communicates with the control device (not shown), which controls the entire Hexapod operation and which captures from the sensor signal the corresponding current position of the respective support ring 13 with respect to stator 14.

Figure 3:
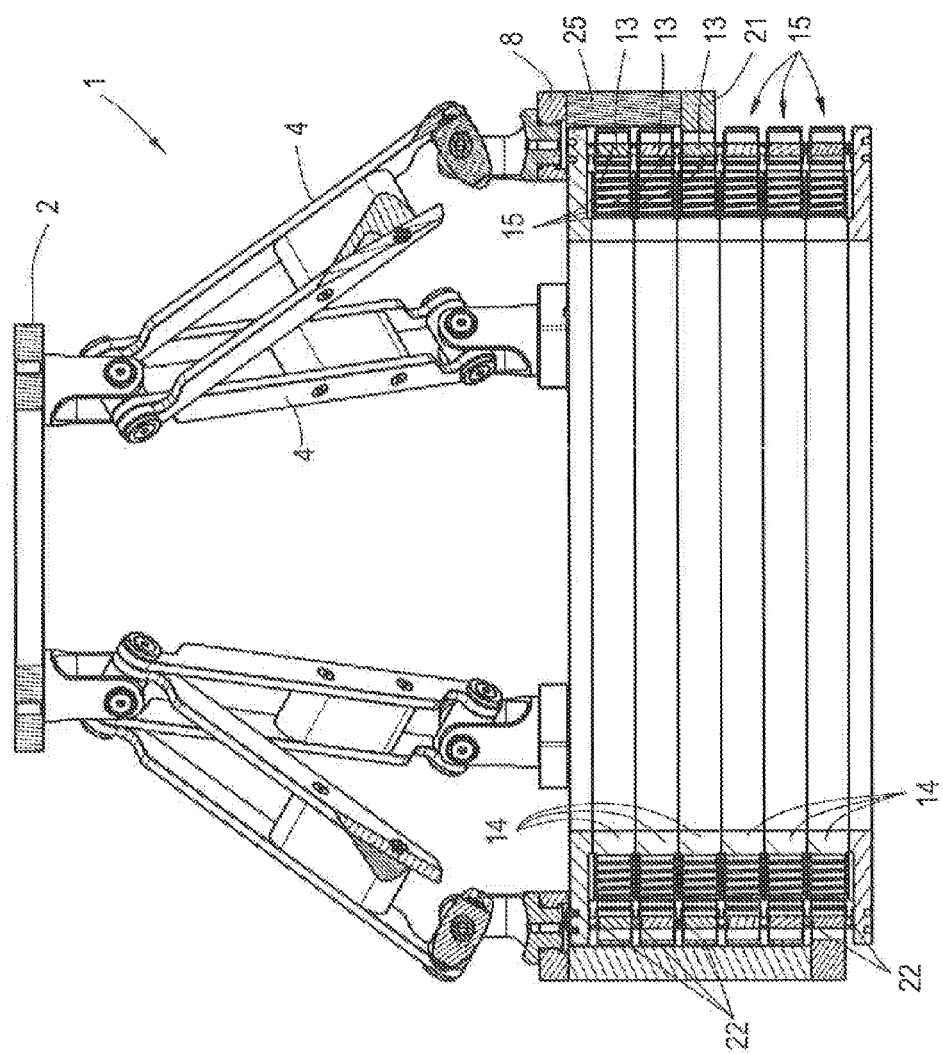
FIG. 3 shows the cross-section of a schematic diagram of a hexapod according to the invention in a second embodiment.
Figure 4:
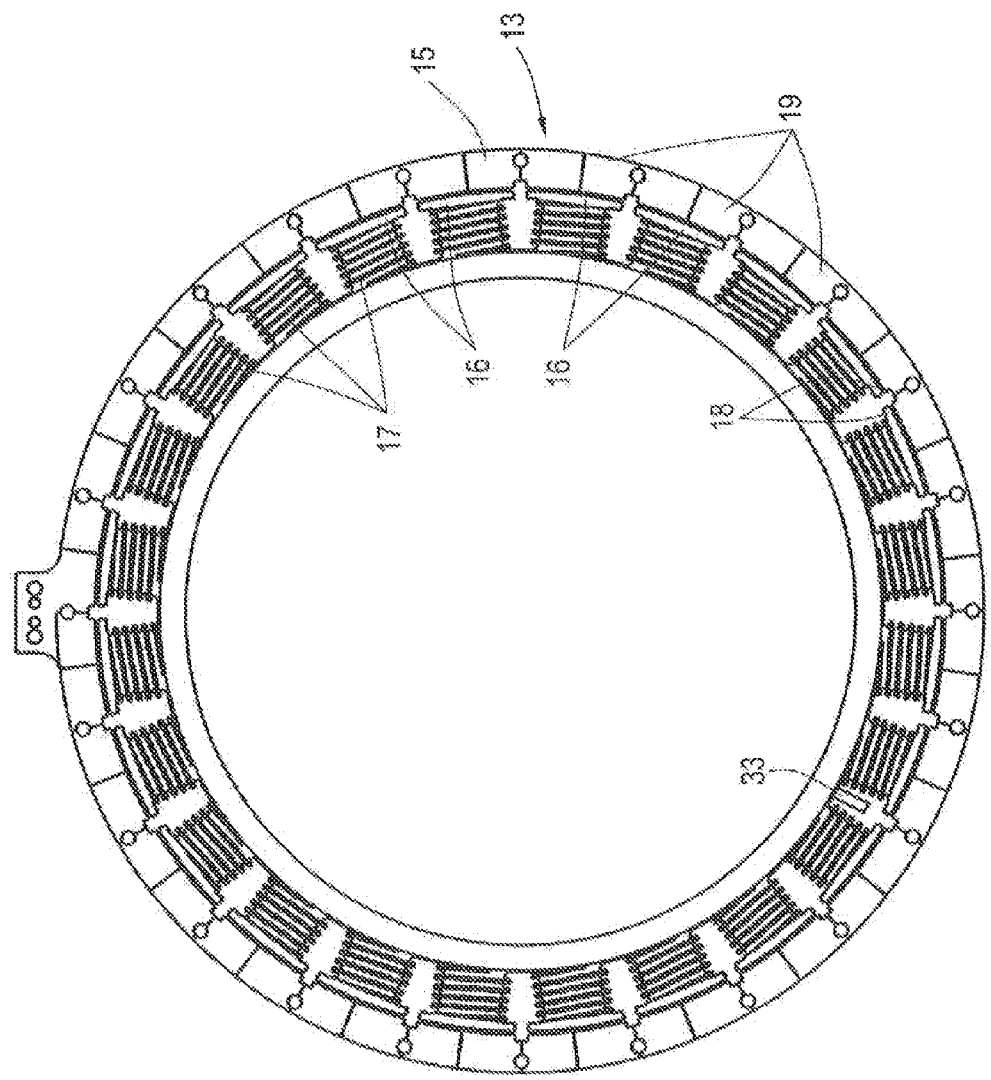
FIG. 4 shows a top view on a support ring-stator arrangement of the hexapod from FIG. 3.
Figure 5:
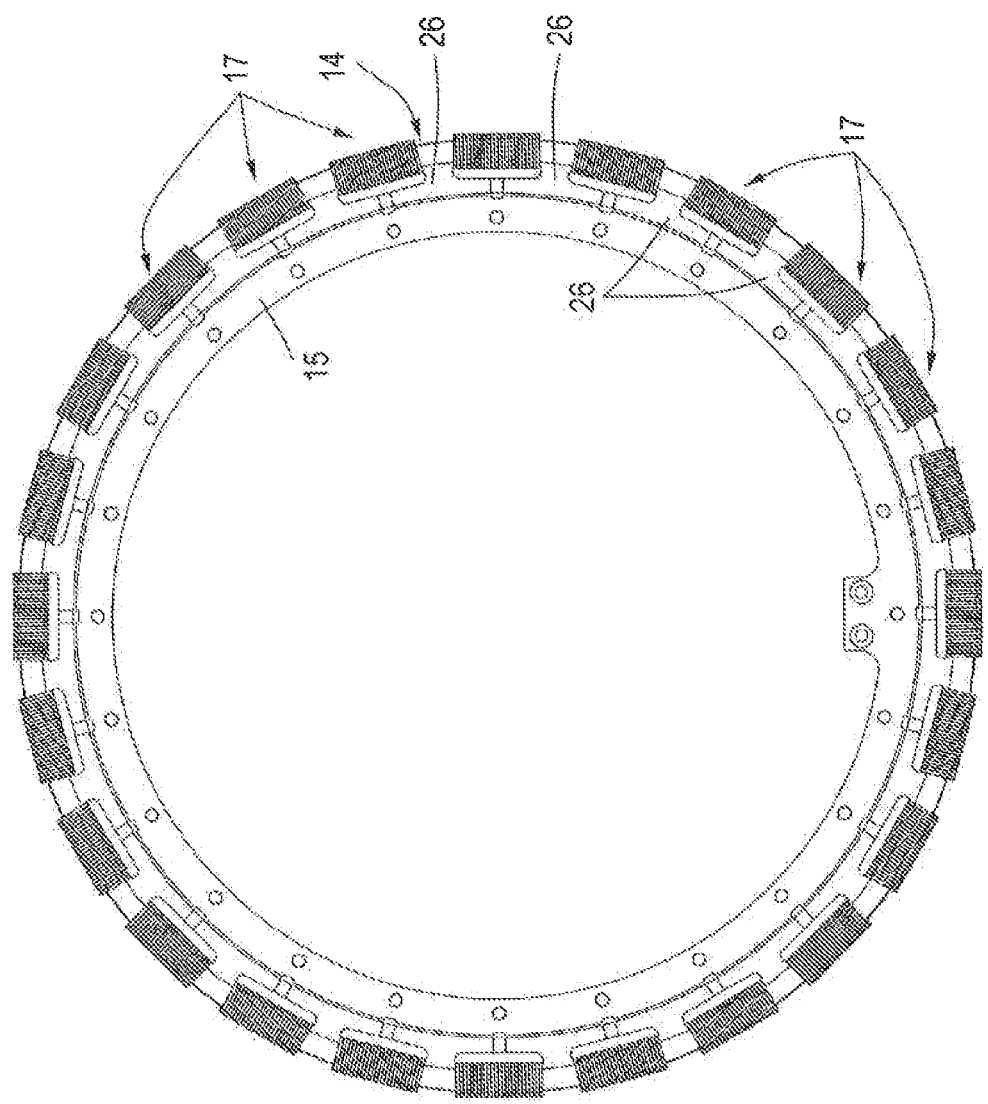
FIG. 5 shows a top view of a further embodiment of a support ring-stator arrangement.

While the FIGS. 1 and 2 show a Hexapod with driving means consisting of rotor 15 and stator 14 of the type internal rotor, the FIGS. 3 and 4 show a Hexapod 1 according to the invention with stator 14 and rotor 15 with an external rotor configuration. The construction of the Hexapod 1 of the FIGS. 3 and 4 corresponds to the greatest possible extent the construction of Hexapod 1 of the FIGS. 1 and 2, especially concerning the receptacle 2, the rods 4 and their bearing at receptacle 2 as well as at the mountings 8. However, in contrast to the embodiment according to FIGS. 1 and 2, here the stators are placed internally while the rotors 15, namely the support rings 13, are arranged externally, enclosing the stators 14. Each stator, in turn, consists of a ring at which, however, now the coil supports 16 are arranged, extending radially, which, in turn, bear the individual wound coils 17. Support ring 13 is located opposite the coil supports 16 with their end-side segments 18, thus rotor 15, also here again consisting of a plurality of individual magnetic elements 19, assembled to a ring form. Again, individual bearing means 22 are provided for the pivot bearing of the individual support rings 13, for example again the already described balls (of course also other rolling elements are conceivable) so that the support rings 13 can be twisted individually relative to each other.

Since the rotors 15 as well as the support rings 13 are arranged at the outside in this embodiment as a result, the mountings 8 have to be conducted to the support rings 13 from the outside, which is why the segment 25 extends on the outside and merges into the fixation segment 21.

Here, also, a position sensor 33, for example a Hall sensor, is provided, which, again, serves the capture of the position of rotor 15 positioned on the outside and which interacts with the magnetic elements 19.

The operating mode corresponds with the mode described regarding the Hexapod 1 of the FIGS. 1 and 2. The generation of suitable magnetic fields occurs by means of selective supply of electricity to individual coils 17 which, by way of interaction with magnetic elements 19 of rotor 15, cause the rotation of rotor 15 by means of which the adjustment of the single rods 4, and resulting from it, receptacle 2 occurs.

FIG. 4 shows another embodiment of a rotor-stator-configuration, again of the internal rotor type. Rotor 15, which here again is identical with support ring 13, is, for example, again constructed of individual magnetic elements 19. Opposite of it stator 14 is arranged on the outside on which a plurality of individual coils 17 is provided which here, however, are wound as ring coils. The coils 17 are here, different from the above described embodiment at which the coils are wound in a radially extending way, wound in the direction of the circumference as it were. In order to couple the generated magnetic fields to rotor 15 upon supply of electricity to the single coils 17, corresponding yokes 26 are provided which form the inside of stator 14 and which are opposite of rotor 15. A user-defined magnetic field variation can be reached with a suitable supply of electricity of the coils 17 which will provide a movement of the individual rotors 15.

Figure 6:
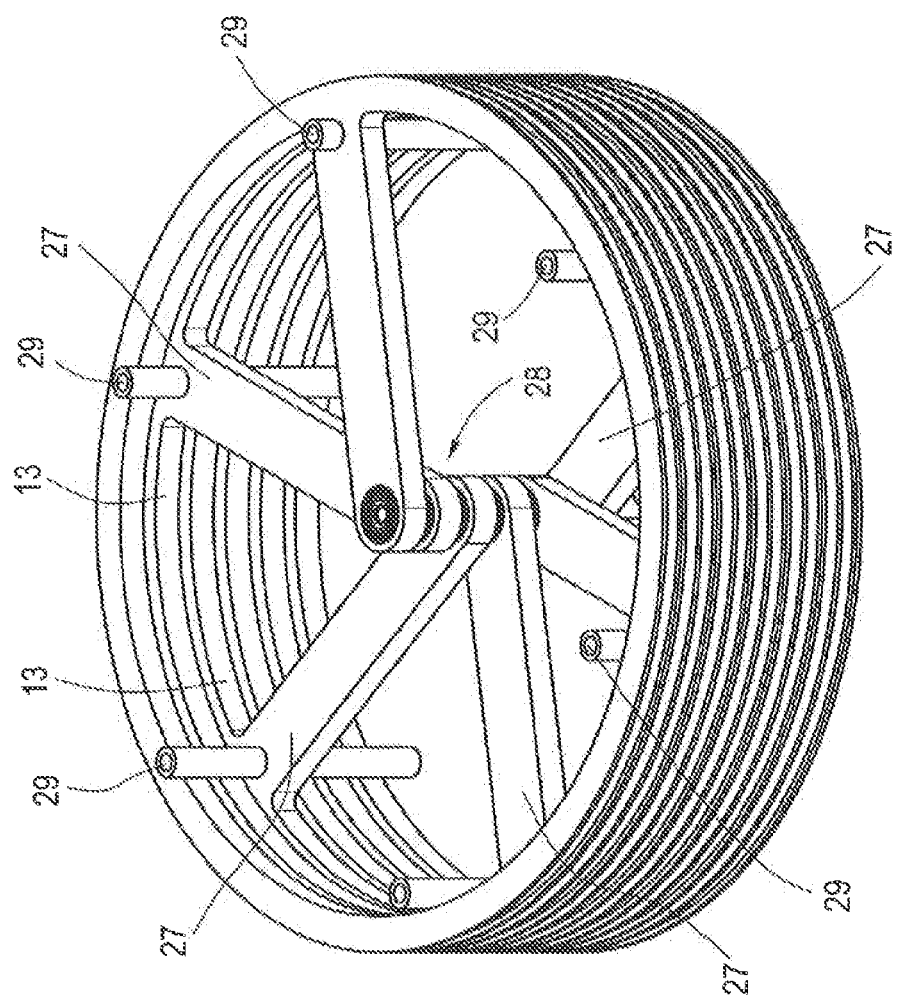
FIG. 6 shows a partial view of a further bearing alternative of the support rings.
Figure 7:
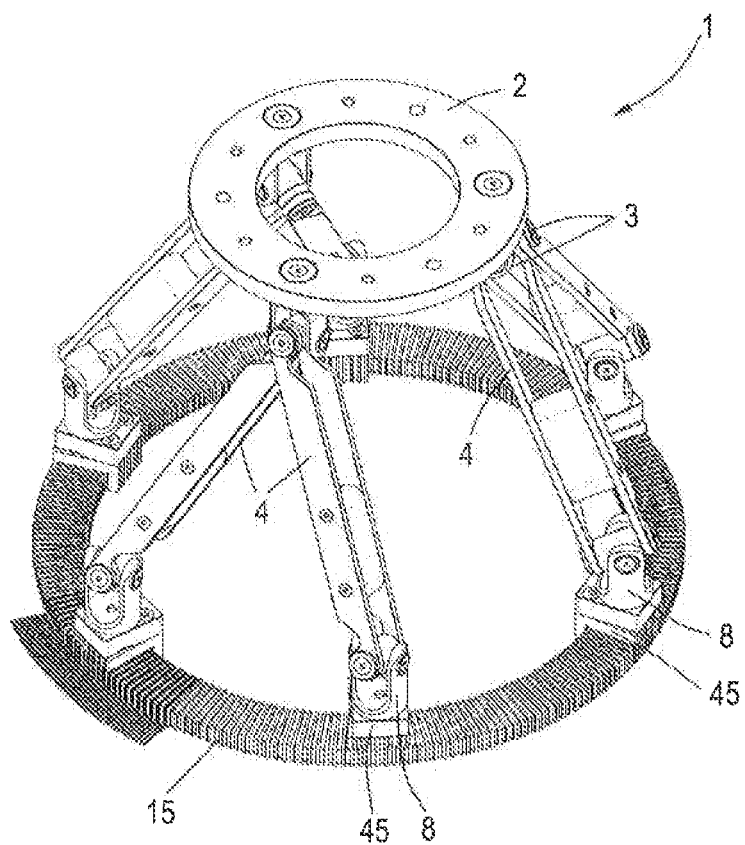
FIG. 7 shows a perspective view of a hexapod of a third embodiment from above.
Figure 8:
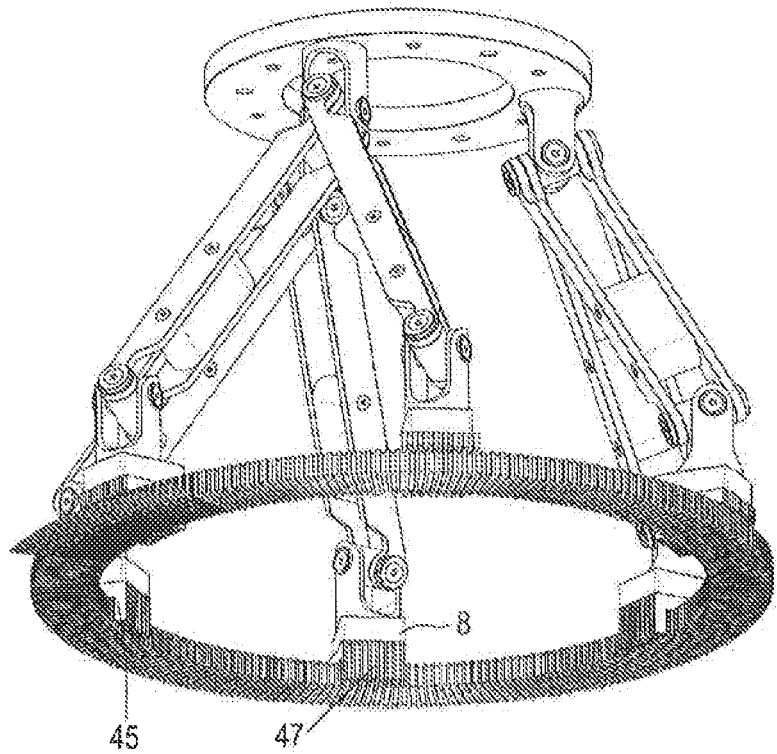
FIG. 8 shows a perspective view of the hexapod from FIG. 7 from below.

FIG. 6 shows in a schematic diagram a further embodiment as well as bearing possibility of the individual support rings 13 whereas here only the support rings 13 but not the assigned stators 14 are shown. In the example shown, each support ring 13 has a bearing arm 27 projecting to the inside, whereas all bearing arms end in the middle of the support rings 13, and are mounted via suitable bearing means such as ball bearings, rollers or alike at a common central bearing support 28. The bearing arm 27 has for this a suitable bearing through hole which, for example, itself forms the outside ring of a ball bearing or into which such an outside ring or the ball bearing itself is shrunk, etc. In any case a simple pivot bearing is given by means of this inner bearing support 28.

Furthermore, holding receptacles 29 are provided on each bearing arm 27 for a separate mounting 8 which here is not explicitly shown. Thus, it can be connected torque proof with the respective support ring 13.

FIGS. 7-10 show an example of a Hexapod 1 of the second fundamental invention alternative in which no support rings but only short support ring segments are used, which are mounted and moved quasi floatingly above a stator via a magnetic field. As far as possible, the same reference signs have been used for the same components.

Hexapod 1 according to this alternative of the invention also comprises a receptacle 2 at which rods 4 are movably mounted in articulated joints 3. Here, the rods 4 are also each pivotably mounted around an axis in a first pivot joint, whereas the pivot joint 5 on its part is pivotably mounted around a second axis at receptacle 2. Also here, a cardan like spherical bearing results from it. We refer to the corresponding description regarding the Hexapod in FIG. 1.

Also here, the other ends of the rods 4 are arranged via a further joint in each case at mountings 8, whereas also this joint again has been designed to be cardanic, compare Hexapod 1 description according to FIG. 1.

Here each mounting 8, however, is—different from the design of the above mentioned embodiments—arranged on a support ring segment 45 which is only a short ring segment and which corresponds with its width essentially to the mounting width. So there are no separate complete support rings but only very short support ring segments are provided. The support ring segments have, seen in a sectional view, fundamentally an L-form, see, for instance, FIG. 8, with a first arm 46 which extends above the only stator 14 provided here and with a second arm 47 which engages on the inside into stator 14. It can be seen that all six support ring segments 45 run on one common stator 14 in this embodiment.

Figure 9:
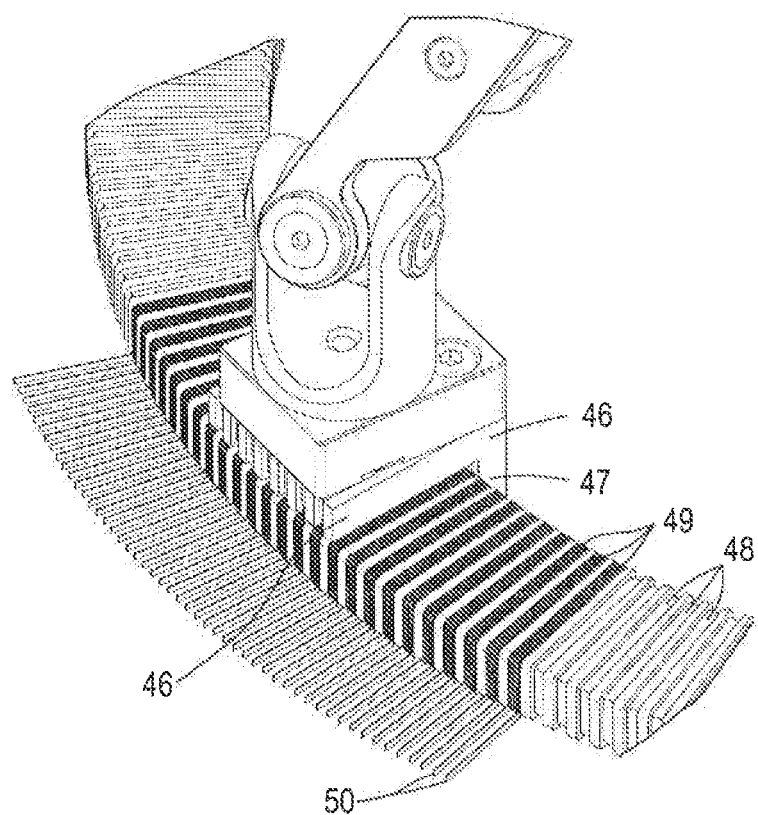
FIG. 9 shows an enlarged partial view of the hexapod according to the view from FIG. 7.
Figure 10:
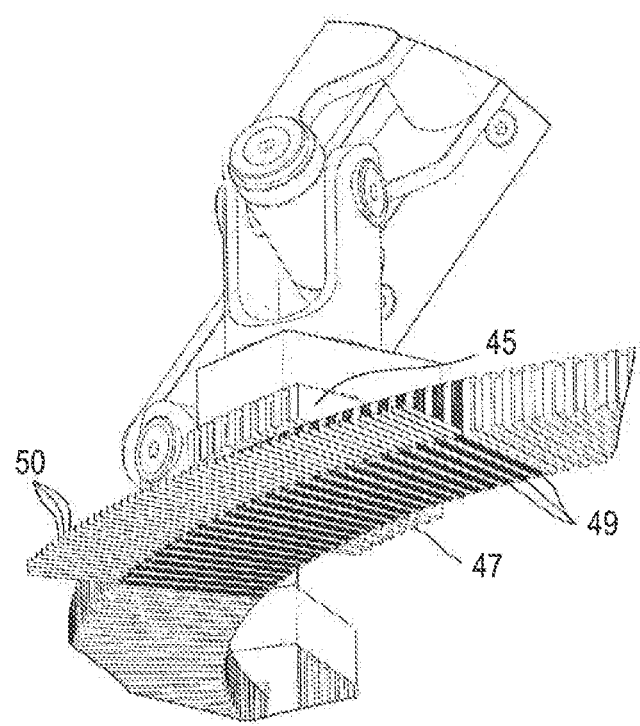
FIG. 10 shows an enlarged partial view of the hexapod according to the view from FIG. 9.

Stator 14 has a groove structure, see diagram in FIGS. 9 and 10, i. e. that a plurality of deepened grooves 48 are provided. One coil 49 is wound in each of these radially extending grooves which, as a result, also extend radially. Each coil 49 can be supplied with electricity via separate lines 50 and can so generate an own magnetic field with a corresponding supply of electricity. There are only a few coils 49 and their lines 50 drawn in the figures for clarity reasons, but of course around the entire stator circumference in each groove 48 a coil 49 is wound, i. e. that user-defined magnetic fields can be generated around the entire stator circumference at user-defined positions by means of supply of electricity to one or several of the coils 49.

These magnetic fields now interact with the respective support ring segment 45. This consists of suitable material, for example it can consist of several permanent magnets arranged next to each other or of other suitable materials which can interact in a certain way with the magnetic fields generated by the coils. The fields interact with both arms 46 and 47 from which a high stiffness on two planes results. This interaction takes shape in such a way that via the magnetic fields generated by the stator each support ring segment 45 is conducted via a narrow gap to the stator 14, i. e. that each support ring segment 45 floats quasi with its arm 46 above stator 14 without touching it. Ultimately, all support ring segments 45 float above stator 14 so that in all a configuration is given borne only by this "basic magnetic field". They are held on the stator only by the magnetic fields generated by the stator, or by their interaction with the support ring segments 45, respectively. Bearing elements are not required here.

The control device, here also not explicitly shown, which controls the entire electricity supply operation of the individual coils 49, now controls these, for example, to that extent that it generates on the one hand the basic magnetic field which keeps the support ring signals 45 at a defined distance to stator 14. On the other hand the electricity supply operation is controlled by this control device to that extent that for the movement of a support ring segment 45 along the stator ring circular path a travelling magnetic field arises, i. e. that a magnetic field is generated according to the desired circumferential shifting distance that interacts with the support ring segment 45 which is to be shifted and travels along this shifting distance at the stator side and that carries along the support ring segment 45. Accordingly, each support ring segment 45 forms the rotor of a linear motor the second component of which is stator 14. I. e. that the drive principle described herein is that of a linear motor which, however, here has been closed to a circular rail path on which the relatively short support ring segments 45, thus the single rotors, run.

The generation of a constant basic magnetic field, however, is not necessarily required. Rather, it is also conceivable to generate only local fields where a support ring segment 45 is located so that the support ring segment 45 is floating above the locally generated magnetic field. This locally generated magnetic field correspondingly can, for movement of the support ring elements, travel along the stator, for which purpose the individual coil windings are controlled in a varying manner accordingly. This means that only those coils 49 are supplied with electricity which actually have to be controlled for generating a magnetic field as a function of the position of the respective support ring segment 45, for generating the local magnetic field. The basic capture, of which coil 49 is be supplied with electricity, or fundamentally the capture of the position of a support ring segment 45 can be executed by suitable position sensors which are preferably provided on the stator side, respectively. This is valid for all embodiments having this functional principle. Again, also here Hall sensors or something similar can be used. If applicable, the position of a support ring segment 45 can also be captured by means of control engineering, since ascertainable field variations occur in the area where a support ring segment 45 is currently present resulting from the interaction between rotor field and stator field, which can be captured and evaluated on the control device side for the determination of the position.

Evidently, it is possible for this embodiment of the invention to modify user-defined the individual support ring segments 45 and therefore the mountings 8 and with these the spatial positions of the single rods 4 coupled with them by the possibility of positioning user-defined the support ring segments 45 within the respective possible circumferential motion path. Any number of 360° turns are of course possible in a simultaneous movement of all support ring segments 45, because also here no connecting lines and something similar are led to the support ring segments 45 or the generally rotating parts of the Hexapod. The only line connections are the stationary lines 45 to the coils 49. All six support ring segments 45 run, as described, on a common stator 14 in the described embodiment. As each support ring segment 45 can be moved separately, but also all support ring segments 45 can rotate by 360° simultaneously, as a result in the embodiment shown six separate virtual circular rail paths are given, around which six separate travelling magnetic fields run by means of control engineering, i. e. that six separate rotating magnetic fields have to be generated for being able to move each individual support ring segment 45 by 360°. This is easily possible by means of suitable control of the individual coils 49, thus the individual stator winding. Very exact and clearly defined magnetic fields can be generated with a correspondingly tight packing, which magnetic fields take over the guidance of the support segments.

The drive principle realized according to the invention is that of a phase sequence linear motor (magnetic levitation train) which here is closed to a ring form. Even though all six support ring segments 45 run in the shown example on a common stator 14, it is of course conceivable, for example, to run only two support ring segments 14 on one stator 14 so that in all three separate stators 14 with two support ring segments 14 each running on them are provided. Alternatively, three support ring segments 45 can also run on one stator 14 so that only two stators 14 are to be provided. The least components and, as a result, the simplest design, however, is the construction shown in FIGS. 7-10, which, however, is a little bit more complex in case of control engineering, because six separately rotating fields have to be generated for the drive via a common stator 14.

Figure 11:
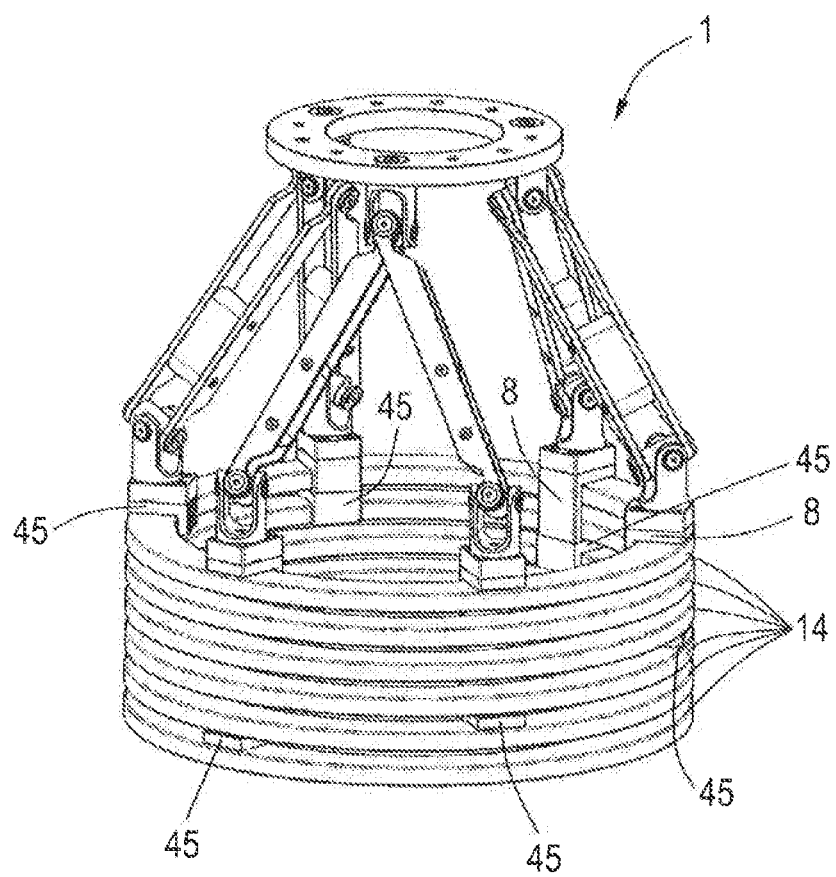
FIG. 11 shows a further embodiment of a hexapod similar to the one from FIG. 7-10, however with one support ring segment for each stator.

FIG. 11 shows, compared with the above mentioned embodiment, a Hexapod 1 which operates with the same linear motor principle for which, however, in all six separate stators 14 are provided, which in each case bear or guide one support ring segment 45. The support ring segments 45 here are connected with the respective mountings 8 which here extend over the required axial length into the concentric construction so that the support ring segment 45 being at their end is in the right position. Also here the movement of the single support ring segments 45 and therefore the rods, occurs via single rotating magnetic fields generated on the stator side, as described above.

FIGS. 12-17 show different examples of use for a Hexapod 1 according to the invention. Even though always a Hexapod 1 with circumferentially closed support rings is shown, of course it also can be a Hexapod with individual support ring segments, with a stator, as exemplarily shown in FIGS. 7-10 or with several stators as described alternatively thereto.

Figure 12:
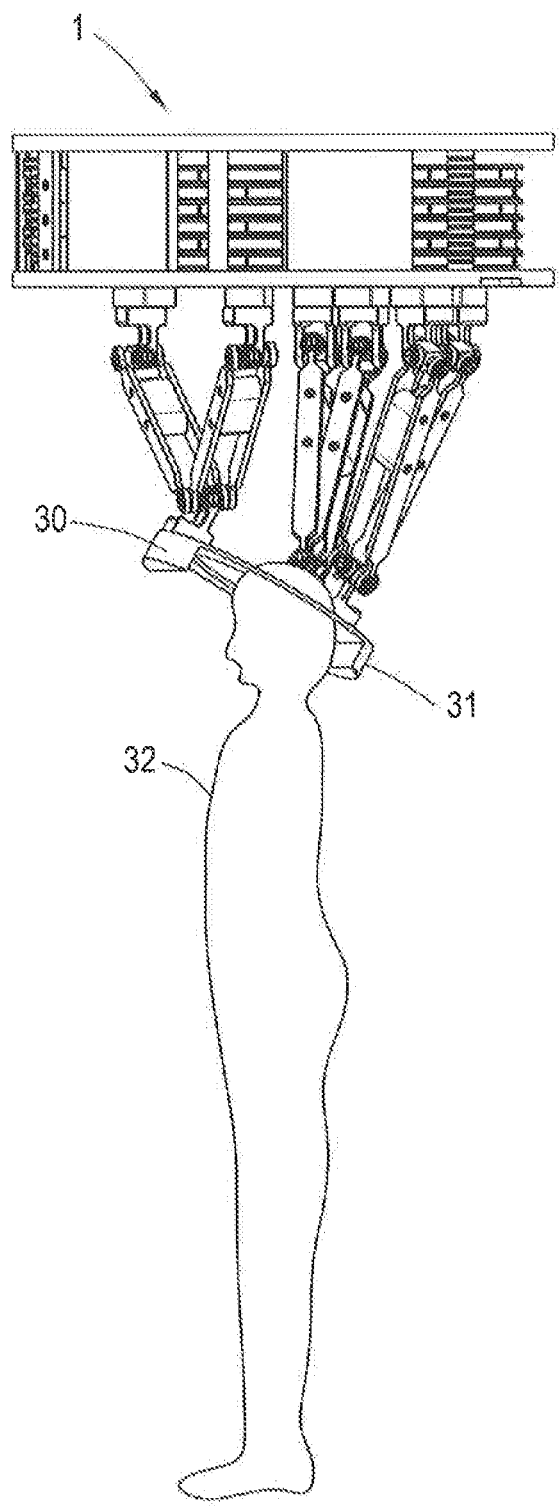
FIG. 12 shows a schematic diagram of a first application of the hexapod according to the invention.

FIG. 12 presents a first example of use of a Hexapod 1 according to the invention. A radiation source 30 and a radiation receiver 31 are here arranged at opposite sides on receptacle 2, here in ring form. The radiation source is, for example, an x-ray tube, the radiation receiver 31 an x-ray receiver. An object 32 is moved into receptacle 2 in ring form, or the receptacle 2 is moved over the object. As the Hexapod itself has an open ring configuration, object 2 also can be moved through the Hexapod itself that is why also longer objects can be processed. Within the scope of the image recording, receptacle 2 and with it radiation source 30 can be inclined and radiation receiver 31 can be tilted so that different image plane positions relative to object 32 can be taken as of course holding fixture 2 can also rotate unlimitedly by 360° around object 32.

Figure 13:
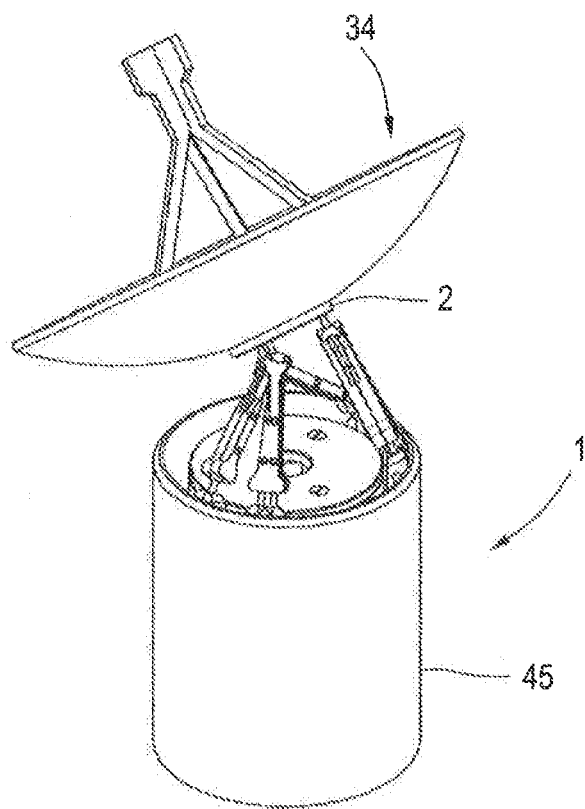
FIG. 13 shows a schematic diagram of a second application of the hexapod according to the invention.

FIG. 13 shows a second example of a possible field of application of the Hexapod 1 according to the invention. Here it serves for the adjustment of a satellite dish or a dish antenna 34 which is arranged on receptacle 2. Hexapod 1 here has an outside housing 35 which encapsulates it against the outside. The satellite dish or the dish antenna can spatially be adjusted user-defined and can be positioned regarding a fixed-point via the fixed in position Hexapod 1.

Figure 14:
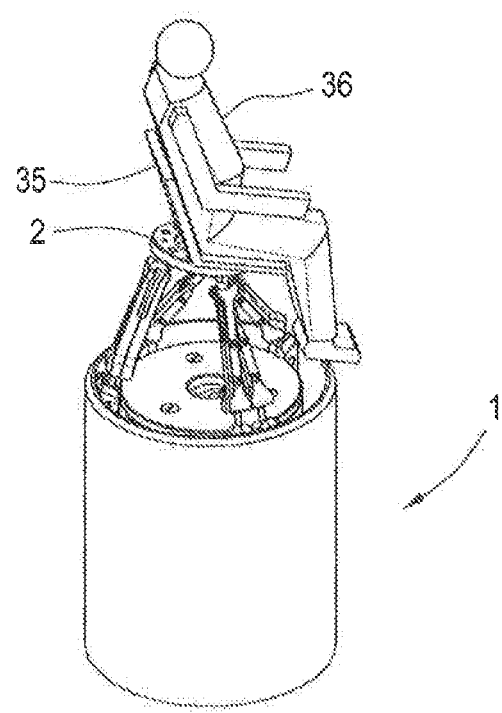
FIG. 14 shows a schematic diagram of a third application of the hexapod according to the invention.

FIG. 14 shows a third possible field of application of the Hexapod 1 according to the invention which here serves the simulation of movements. Here a chair 35 is arranged on receptacle 2, on which chair 35 a person 36 is seated in the presented example. Chair 35 is moved by Hexapod 1 for the simulation of movements, for example in connection with a games console or with a 3D cinema for the simulation of effects or for flight simulators or driving simulators; it can be twisted and inclined, for simulating the desired movement.

Figure 15:
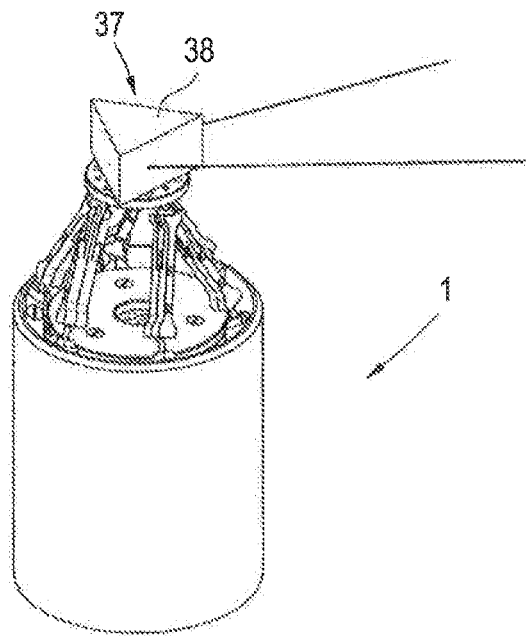
FIG. 15 shows a schematic diagram of a fourth application of the hexapod according to the invention.

FIG. 15 presents the use of the Hexapod according to the invention as support and at the same time adjusting element for an optical component 37, here in form of a prism 38 which, for example serves as deflection element for a laser beam or the like. The prism 38 is only an example, of course any other optical elements like mirrors or lenses and similar objects can also be adjusted by Hexapod 1.

FIG. 16 presents the use of the Hexapod according to the invention as support and adjusting element for a work piece 39 to be processed, here an optical lens 40 to be ground. The work piece 39 is fixed on a receptacle 2 via a suitable mounting. Work piece 39 is moved relatively to a motionless tool 41, here a lens grinder 42, by Hexapod 1 so that this grinder can, for example, grind the work piece 39. It is, of course, also conceivable to arrange a metal component as work piece 39 which is machined by tool 41. Tool 41 can also be a laser or a tool by which, for example, glue or the like is applied. This means that the tool 41 and the action carried out on the work piece 39 can be user-defined, also work piece 39 can be user-defined. The basic principle is, however, that work piece 39 is moved past tool 41 by Hexapod 1.

Finally, FIG. 17 shows the embodiment for a possible field of application of Hexapod 1 according to the invention as a support for tool 43 here, for example, in form of a cutter 44. Tool 43 is directly fixed on the receptacle 2 of Hexapod 1 and can by means of rotation of the rods 4 and with this of receptacle 2 be rotated with high speed, while maintaining the previously set spatial orientation. I. e. that the machining of a fixed in position work piece is possible by means of intrinsic rotation. Furthermore, the envelope which the tool describes within the scope of a spatial movement can also be changed during the main rotation by means of adjustment of the rods 4, i. e. that tool 43 can be spatially moved and run along the fixed in position work piece during ongoing rotation of tool 43.

The applicability of Hexapod 1 according to the invention is not limited to the described embodiments neither regarding the fields of application nor concrete construction of the Hexapod which can be realized in each configuration according to the invention. Rather, Hexapod 1 can be used for the movement of any object within space, ultimately independent of their size, as Hexapod 1 itself can be dimensioned in any size and capacity. It can have a small format with a diameter of, for example, a few ten centimeters, can, however, also have a diameter of one or several meters, depending on the object to be moved and the adjustment task to be executed.

The invention claimed is:

1. A Hexapod comprising: a plate-shaped receptacle on which at least five rods having ends mounted in joints are arranged, wherein the other end of each rod is articulated on a respective mounting, wherein all the mountings can be moved along a circular path, wherein each of the mountings is arranged on a respective support ring of a plurality of support rings, wherein the respective support rings and the mountings arranged thereon are movable, and that each of the respective support rings constitutes a respective rotor or part of a respective rotor of an electromotive drive means, further comprising a respective ring-shaped stator assigned to each the respective support rings.

2. Hexapod according to claim 1, wherein the support rings are arranged concentric one on top of each other or are arranged concentric and located one in one another or that the support rings are vertically arranged and radially stepped to each other.

3. Hexapod according to claim 1, wherein each of the respective rotors is arranged within the stator assigned to it or that the stator is arranged within the respective rotor assigned to it.

4. Hexapod according to claim 1, wherein the support rings are mounted via bearing means at at least one fixed in position component or mounted via bearing means arranged between them.

5. Hexapod according to claim 4, wherein the at least one fixed in position component is the respective stator.

6. Hexapod according to claim 1, wherein each of the support rings has a bearing arm, and all bearing arms are mounted via bearing means at one central bearing support.

* * * * *